United States Patent Office 2,798,834
Patented July 9, 1957

2,798,834

STREPTOMYCIN PLUS DIHYDROSTREPTOMYCIN COMPOSITIONS

Lawrence B. Hobson, Larchmont, N. Y., assignor to Olin Mathieson Chemical Corporation, New York, N. Y., a corporation of Virginia No Drawing. Application October 24, 1952, Serial No. 316,785

7 Claims. (Cl. 167—65)

This invention relates to, and has for its object the improvement of, preparations for streptomycin therapy, i. e., preparations for the treatment of infections by organisms susceptible to the antibiotic effect of streptomycin or dihydrostreptomycin.

Streptomycin, a potent antibiotic obtainable by the culturing of *Streptomyces griseus*, has been widely and effectively used against infections by a variety of gram-negative and gram-positive pathogenic bacteria, notably the tubercle bacillus. However, when streptomycin therapy is prolonged, as required for successful treatment in certain cases, permanent and grave neurological damage marked by severe vertigo and/or loss of hearing may occur. Because of these possibilities, careful audiometric and vestibular function tests prior to and during streptomycin therapy is indicated.

With the introduction of dihydrostreptomycin, a derivative of streptomycin (obtainable, for example, by the catalytic hydrogenation or electrolytic reduction of streptomycin), it was initially thought that neurological damage would no longer be a problem. However, it was found that such damage still occurred, and its incidence and character has been such as to lead many physicians to revert to treatment with streptomycin. Particularly distressing was the fact that auditory damage could occur without warning signal, and even after treatment with dihydrostreptomycin had been discontinued.

On the basis of extensive studies, it has been concluded that while streptomycin and dihydrostreptomycin are alike in therapeutic benefit, streptomycin produces more vestibular damage than dihydrostreptomycin, and dihydrostreptomycin produces more auditory damage than streptomycin.

It has been found that the neurological damage incident to streptomycin therapy can be substantially decreased or virtually eliminated, without sacrificing therapeutic benefit, by administering streptomycin and dihydrostreptomycin in concurrent courses, with these agents in a molar ratio between about 2:1 and about 1:2, and with the combined dosage being equal on a molar basis to the dosage of either agent when administered without the other. Preferably, these agents are in a molar ratio of the order of 1:1, and the dosage of each agent is of the order of one-half the molar dosage of that agent when administered without the other. For convenience of administration (e. g., enabling a single injection), and for assurance that the aforementioned ratio and dosage requirements are met in routine therapy, the streptomycin and dihydrostreptomycin are provided in a unitary form for administration, preferably intermixed as a single composition, and preferably also either in dosage-unit form or in a form readily subdividable into unit doses.

It has been demonstrated by clinical trial that, on treatment with concurrent courses of streptomycin and dihydrostreptomycin, as contrasted with treatment with either agent alone, at least equal therapeutic benefit is obtained with a substantially lowered incidence and severity of both vestibular and auditory damage (although it might well have been expected that the streptomycin and dihydrostreptomycin would potentiate each other's neurotoxicity). Thus, in one series of tests, one group of patients with pulmonary tuberculosis were given 0.5 g. of each of streptomycin sulfate and dihydrostreptomycin sulfate daily for 120 days, without overt toxicity or reaction, and with therapeutic response equal to a similar period of conventional streptomycin therapy. Moreover, a sub-group of these patients were studied as to oto-toxicity for a period of at least six months post-therapy, but none showed any subjective or objective signs of oto-toxicity, either auditory or vestibular (0% oto-toxicity). The objective tests consisted of audiometric and caloric tests before therapy, at the end of therapy, and at two month intervals thereafter. In contrast in a second group of patients given 1.0 g. streptomycin sulfate daily for a like period and studied post-therapy, 18% developed evidence of oto-toxicity, all vestibular in nature; and in a third group of patients given 1.0 g. dihydrostreptomycin sulfate daily for a like period and studied post-therapy, 15% developed evidence of auditory oto-toxicity, and 6% evidence of vestibular oto-toxicity.

The term "streptomycin," as employed herein, has reference to this antibiotic in its therapeutically-employable forms, inter alia, its water-soluble addition-salts with mineral acids (such as the sulfate, hydrochloride, and phosphate), its salts with fatty acids (such as the acetate, propionate and laurate), and its complexes (such as the trihydrochloride-calcium chloride double salt); and the term "dihydrostreptomycin" is employed herein in the same sense.

The preparations of this invention may be provided in the various forms employed for administration of either streptomycin or dihydrostreptomycin; inter alia, in forms adapted for administration by intramuscular injection, subcutaneous injection, intrapleural injection, intrathecal injection, intraperitoneal injection, topical application, and by the oral and inhalation routes. The preparations may include any desirable (and compatible) substances improving the formulation or administration of the streptomycin and dihydrostreptomycin, and/or any other compatible antibiotics (e. g., a therapeutically-utilizable salt or ester of penicillin), chemotherapeutic agents (e. g., isoniazid or derivative thereof) or other medicinal agents (e. g., procaine hydrochloride) advantageously associated with streptomycin or dihydrostreptomycin in therapy. In all such preparations, the aforementioned ratio and dosage requirements would apply to the streptomycin and dihydrostreptomycin components.

The following examples are illustrative of the preparations of this invention, all weights, concentrations and dosages of the streptomycin and/or dihydrostreptomycin components specified being calculated as the free base (thus, for example, the composition of Example 1 contains an amount of streptomycin sulfate equivalent to 0.5 g. streptomycin base):

*Example 1*

Dry, sterile, powdered (amorphous or crystalline) streptomycin sulfate and dry sterile powdered dihydrostreptomycin sulfate are combined in a weight ratio of 1:1 until a uniform mixture is obtained, and the mixture is sterile-packaged (e. g., packaged under aseptic conditions in sterile vials) with each 5 cc. vial containing substantially 0.5 g. of each of the streptomycin sulfate and dihydrostreptomycin sulfate.

[Alternatively, 0.5 g. of each of the streptomycin sulfate and the dihydrostreptomycin sulfate is separately added to each 5 cc. vial, uniform mixture being obtained on dissolving the contents of the vial in an aqueous parenteral medium. As a further alternative, the streptomycin sulfate and dihydrostreptomycin sulfate, in a weight ratio of 1:1, are either separately or together dissolved in sufficient distilled water for vial filling, the solution is volumetrically subdivided into vials to provide 0.5 g. of each of the salts, and the solution then lyophilized in the vials.]

In using this composition for the treatment of tuberculosis, for example, the contents of the vial is dissolved in an aqueous parenteral medium to a concentration of 0.25 to 0.5 g. of the composition per cc.; and the solution is administered in the same manner as the corresponding streptomycin sulfate solution containing 0.25 to 0.5 g. streptomycin sulfate per cc., e. g., in a regimen of 1.0 g. of the composition intramuscularly every three days, along with 12 g. para-aminosalicylic acid daily. Utilizable aqueous parenteral media include pyrogen-free, sterile, distilled water, isotonic sodium chloride solution, 5% dextrose solution, and local anesthetics (e. g., 1% procaine hydrochloride) in distilled water.

The same composition may be packaged in 12 cc. and 20 cc. vials, containing respectively 2.0 g. and 5.0 g. of the composition.

For inhalation therapy (as an adjunct to systemic therapy in non-tuberculosis bronchial and pulmonary infections), the composition is dissolved in distilled water to make a solution containing 50 to 100 mg. of the composition per cc. (advantageously with inclusion of crystalline sodium penicillin), and 1–2 cc. of the solution is administered by nebulization 5–6 times daily.

*Example 2*

The following components in dry, sterile, powder form are combined into a uniform mixture in such proportions as to yield a dose of the indicated composition:

Procaine penicillin G_____units__ 300,000
Potassium penicillin G_____do____ 100,000
Streptomycin sulfate_____g__ 0.25
Dihydrostreptomycin sulfate_____g__ 0.25

The mixture is sterile-packaged in vials of 1 or 5 doses.

In using this composition, sufficient aqueous parenteral medium is added to provide a volume of 2.0 cc. per single dose, the composition forming a uniform suspension on shaking; and the suspension is intramuscularly injected. Thus, for surgical prophylaxis, 2 to 3 single dose vials are administered for 1 or 2 days before operation and for 7 to 10 days after.

Preferably, the potassium penicillin G is crystalline, and buffered; and sodium penicillin may be employed in place thereof. Also, the composition may be altered to contain 0.5 g. of each of the streptomycin sulfate and dihydrostreptomycin sulfate components, or by eliminating the potassium (or sodium) penicillin content.

*Example 3*

For oral use, streptomycin sulfate and dihydrostreptomycin sulfate are incorporated, in a weight ratio of 1:1, into an orally-acceptable liquid medium in a concentration of 25 mg. of each component per cc. Preferably, the liquid medium is a sweetened (e. g., with sucrose), flavored (e. g., with cherry juice), and alcoholic (e. g., 4%) syrup. For the treatment of shigellosis, for example, this composition is administered orally in doses of 20 to 120° cc. per day for 5–7 days.

Although the action of orally administered streptomycin is almost entirely limited to the lumen of the intestine, and there is relatively little danger of neurotoxicity, the utilization of this invention in connection with a preparation for oral use is advantageous in that it assures minimal incidence of neurological damage.

*Example 4*

Sterile streptomycin sulfate and sterile dihydrostreptomycin sulfate, in a weight ratio of 1:1, are dissolved in sterile, pyrogen-free distilled water to a concentration of 0.5 g. (of both) per cc., 1–3% sodium citrate and 0.2% sodium bisulfite are added as buffer and preservative, respectively, and the solution is sterile-packaged in single-dose (e. g., 2 cc.) or multiple-dose vials.

This solution is employed in the same manner as the solutions extemporaneously prepared from the dry composition described in Example 1.

*Example 5*

A uniform mixture of dry, suitable-powdered streptomycin sulfate and dihydrostreptomycin sulfate in a weight ratio of 1:1 is packaged in a disposable plastic inhaler (e. g., of the type shown in U. S. Patent No. 2,590,832), for use where inhalation therapy with streptomycin or dihydrostreptomycin is indicated. With such inhaler, the powder is discharged in small increments, and inhalation of the desired dosage may readily be controlled.

*Example 6*

A sterile aqueous suspension is prepared containing per 2 cc. dose:

Procaine penicillin G_____units__ 400,000
Streptomycin sulfate_____g__ 0.25
Dihydrostreptomycin sulfate_____g__ 0.25
Sodium citrate_____mg__ 40 along with suitable dispersing agents and preservatives, and the suspension is sterile-packaged in single-dose or multiple-does vials.

The combination of streptomycin sulfate and dihydrostreptomycin may be embodied in a large number and variety of other formulations or presentations. Thus, it may be tabletted with suitable excipients, e. g., to provide tablets containing .05 g. of each component, for use in making up solutions for aerosol therapy. Also, it may be packaged in one chamber of a two-compartment, disposable injection unit, either alone or with sodium or potassium penicillin, and sterile procaine penicillin suspension packaged in the other compartment, the proportions of the various components being the same as those in the composition of Example 2.

Because the sulfate, though preferred, is representative of the therapeutically-employable forms of streptomycin and dihydrostreptomycin, each of the foregoing examples employs that form; but it is of course intended that the specific compositions and presentations described therein may be prepared with another form or forms of these agents, e. g., the trihydrochloride.

The foregoing examples combine streptomycin and dihydrostreptomycin in a weight ratio of 1:1 (a molar ratio of about 1:1), because a molar ratio of the order of 1:1 yields the best results. However, similar combinations in molar ratios departing from 1:1 in either direction are obviously obtainable in the same manner, and those yielding a substantial part of the advantage of the 1:1 combination are regarded as within the scope of this invention. The examples are accordingly to be considered as illustrative only.

The invention may be variously otherwise embodied within the scope of the appended claims.

I claim:

1. An improved preparation for streptomycin therapy, essentially comprising streptomycin and dihydrostreptomycin in a unitary form for administration, and in a molar ratio between about 2:1 and about 1:2, the amount of both these components in each dose supplied by the preparation being equal on a molar basis to the dosage of either component when administered without the other.

2. An improved preparation for streptomycin therapy, essentially comprising streptomycin and dihydrostreptomycin in a unitary form for administration, and in a molar ratio of the order of 1:1, the amount of each of these components in each dose supplied by the preparation being of the order of one-half the molar dosage of that component when administered without the other.

3. The preparation defined by claim 1, in which the streptomycin and dihydrostreptomycin are intermixed as a single composition.

4. The preparation defined by claim 3, in dosage-unit form.

5. The preparation defined by claim 3, in which the mixture is in dry, powdered, sterile-packaged form.

6. The preparation defined by claim 1, in which the streptomycin and dihydrostreptomycin are incorporated in an orally-acceptable liquid medium.

7. The preparation defined by claim 1, in which the streptomycin and dihydrostreptomycin are incorporated in a parenterally-acceptable liquid medium.

References Cited in the file of this patent

Waksman: "Streptomycin," Williams and Wilkins Co., Baltimore, Md. 1949, pp. 9, 47, 52, 70, 75, 271, 272, 273, 289, 290, 542–545.

Drug Trade News, May 11, 1953, p. 52, "Streptomycin, dihydro drug offered."

Am. J. Pharm., vol. 122, No. 10, October 1950, pp. 374, 375.

Drug Trade News, Feb. 4, 1952, p. 57, "Synergistic pairs."

J. A. M. A., Feb. 23, 1952, pp. 600 and 601, especially p. 601, col. 2.

Kollmer: "Synergistic or additive activity of chemotherapeutic compounds," Am. J. Med. Sci., February 1948, pp. 136–148 especially pp. 146–148.